(No Model.)
W. D. THOMAS.
PRESSURE REGULATOR AND CUT-OFF.
No. 378,342. Patented Feb. 21, 1888.
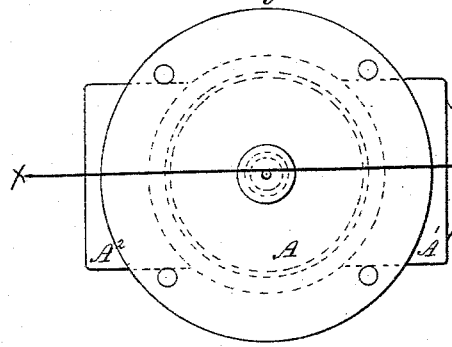
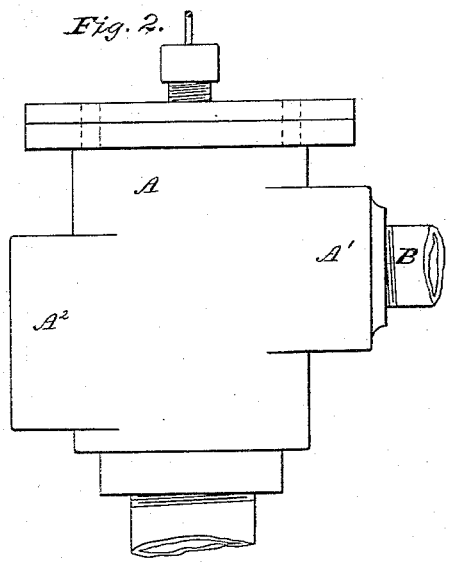
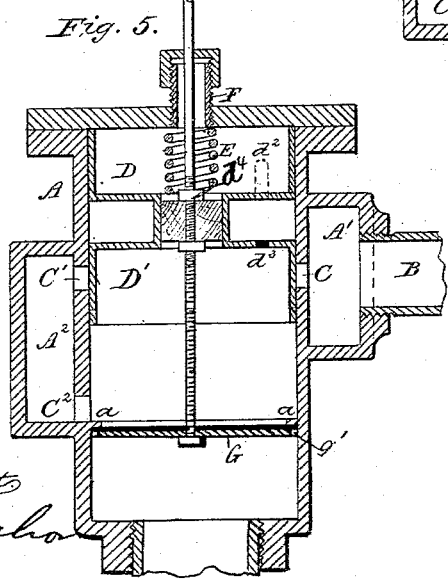
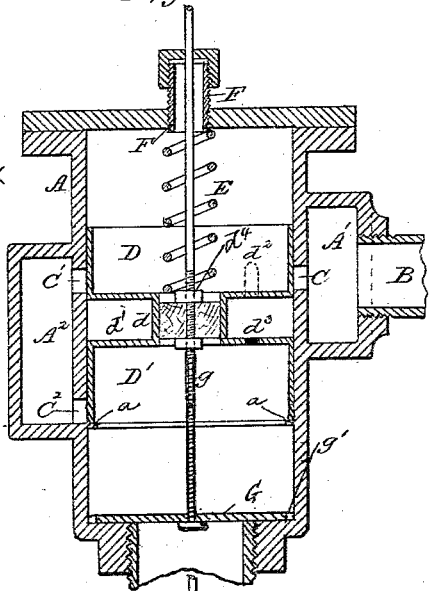
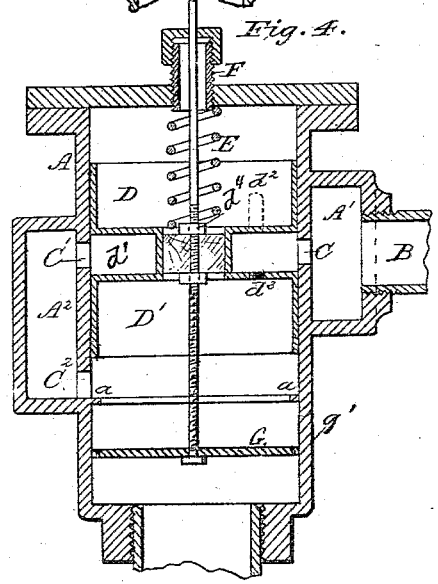
Witnesses:
Inventor:
W. D. Thomas,
By
Attorney.

United States Patent Office.

WILLIAM D. THOMAS, OF PITTSBURG, PENNSYLVANIA, ASSIGNOR OF ONE-HALF TO T. B. ATTERBURY, OF SAME PLACE.

PRESSURE REGULATOR AND CUT-OFF.

SPECIFICATION forming part of Letters Patent No. 378,342, dated February 21, 1888.

Application filed September 19, 1887. Serial No. 250,093. (No model.)

*To all whom it may concern:*

Be it known that I, WILLIAM D. THOMAS, a citizen of the United States of America, residing at Pittsburg, in the county of Allegheny and State of Pennsylvania, have invented certain new and useful Improvements in Pressure-Regulators, of which the following is a specification, reference being had therein to the accompanying drawings.

My invention relates to devices for automatically regulating the pressure of gases or fluids by means of a valve or valves which open and close communications between the inlet and outlet ports of the regulator and are actuated by the increase and reduction of the gases or fluids within the pipes leading to the ports and by means of a spring pressing upon said valve or valves which will regulate or gage the degree of pressure at which the valve or valves will operate.

The object of my invention is, mainly, to construct a device which will be actuated with precision, accuracy, and regularity of movement and will not be subject to sudden fluctuations of gas or fluid admitted to or passing through it; and my invention consists in certain novel features and combinations of parts, all as hereinafter described.

In the accompanying drawings, Figure 1 is a plan, and Fig. 2 is a side elevation, of the outer casing. Figs. 3, 4, and 5 are sectional elevations on line $x\ x$ of Fig. 1, illustrating the various relative positions of the parts within said casing assumed in the operation of the device, as will hereinafter appear.

A cylindrical casing, A, has a chamber, A', communicating with the inlet-pipe B and port C of the casing, and a chamber, A², located on the opposite side of said casing, which communicates with the interior thereof by a port, C', located opposite the port C, and by a port, C², located below the same. A plunger, D, and a similar plunger, D', are connected by a central stem, $d$, to leave a space, $d'$, between them, and are each fitted snugly within the cylindrical case A to reciprocate therein. A spiral spring, E, presses against the upper side of the plunger D, and is adjusted by a set-screw, F, to the required degree of tension to hold the said plungers D and D' down and close the ports C, C', and C² in the cylinder when not overcome by the pressure of the gas beneath the plunger D'. The plunger D' is arrested at the end of the downward throw, when the ports C, C', and C² are closed by contact with the upper side of an annular inwardly-projecting flange, $a$, the lower side of which serves as a seat for a disk, G, connected with the plunger D' by a stem, $g$, and raised to rest against said seat when the plungers D D' are at the limit of their upward movement. Perforations $g'$ in the rim of the disk G permit the gas or fluid to escape or pass freely from the upper to the lower side of the said disk when the plungers D D' are depressed, and are closed by means of the flange $a$ to shut off such communication when the said plungers are raised to their full height within the casing by the excessive pressure of the gas therein.

A small groove or channel, $d^2$, is formed upon the periphery of the upper plunger, D, from the middle to the lower edge thereof, and a hole, $d^3$, of similar area, is bored through the head of the lower plunger, D'. A square boss, $d^4$, projects from the upper side of the upper plunger, D, and is reached by a key passing through the hole in the upper end of the casing when the set-screw F is removed, by which means the plungers D and D' may be turned within the casing to bring the channel $d^2$ either opposite to or away from the port C, which admits the fluid or gas from the inlet-pipe and chamber to the space $e'$ between the upper and lower plungers. When the plungers are down, as shown in Fig. 3, and the regulator is to be set or adjusted, the channel $d^2$ is turned until it comes opposite the port C, and the gas or fluid gradually passes through the channel $d^2$ and space $d'$ and hole $d^3$ to the lower side of the plunger D' and fills the outlet-pipe to its full carrying capacity and until the pressure within the lower portion of the casing A is sufficient to raise the plungers. If there be no leaks, the pressure will increase until it acts upon the lower side of the plunger D' and overcomes the pressure of the spring and causes the same to be raised to the position shown in Fig. 4, the pressure of the spring being properly adjusted, in which position the gas or fluid passes from the port C through the space $d'$, port C', chamber A², and port C² to the lower portion of the casing; and thence through the perforations g' in the disk G to the outlet-pipe. The plunger may now be revolved by means of the key until the channel $d^2$ is in its original position away from the port C, when the parts are in position shown in Fig. 4, where the plunger is properly balanced to the required pressure and will so remain until the pressure within the outlet-pipe is increased. Should this pressure from any cause be increased to a greater degree than that for which it is set, the accumulated force of the gas or fluid will act on the lower side of the plunger D' and force the same, together with the plunger D, up into the position shown in Fig. 5, thus closing the ports C C'. This increased pressure will also raise the disk G until it rests against the flange a and closes the openings g' in the periphery of the disk, thus completely closing communication with the supply-pipe and preventing the gas from escaping through the regulator and accumulating within said pipe to a pressure greater than that to which the regulator is set.

Should the gas be shut off by a stop-cock and the pressure reduced within the supply-pipe, the plunger will drop to the position shown in Fig. 3, and thus prevent the gas or fluid, even if turned on again, from passing through the regulator into the supply-pipe unless the plungers are first revolved or set to bring the channel $d^2$ opposite the port C, as before stated. If, however, it is desired to permit the device to act automatically, then the channel $d^2$ is always left opposite the port C.

Having now described my invention, I claim—

1. In a pressure-regulator, the casing having inlet and outlet ports located opposite each other, and a chamber communicating with one of said ports and with a port in the chamber below the same communicating with the exit-pipe, in combination with a double plunger having a space to communicate with said inlet and outlet ports arranged to reciprocate within said cylinder, substantially as described.

2. In a pressure-regulator, the casing having inlet and outlet ports located opposite each other, and a chamber communicating with one of said ports and with a port communicating with the interior of the chamber and with the exit-pipe, in combination with a double plunger having a space communicating with said oppositely-located ports and arranged to reciprocate within said cylinder, and a spiral spring located above the plunger to act thereon, substantially as described.

3. In a pressure-regulator, the combination, with a casing, of a plunger adapted to reciprocate therein to open and close ports between the casing and supply-pipe, and a disk secured to the plunger to be raised or lowered and close against a seat within the casing when the plungers have been raised and the ports of the casing closed thereby, substantially as set forth.

4. In a pressure-regulator, the combination, with the casing A, having ports C C' C² and chamber A², of plungers D D', having a space, $d'$, between the same, a channel, $d^2$, upon the periphery of the plunger D, and a hole, $d^3$, passing through the plunger D', and an inlet and outlet pipe connected with the casing, substantially as set forth.

5. In a pressure-regulator, the combination, with the casing A, having ports C C' C² and chamber A², of plungers D D', having a space, $d'$, between the same, a channel, $d^2$, hole $d^3$, and a boss, $d^4$, inlet and outlet pipes, and an opening in the upper end of the casing to give access to the boss $d^4$, substantially as described.

6. In a pressure-regulator, the combination of the casing, the plunger adapted to reciprocate therein to open and close the ports between the casing and supply-pipe, with the flange a, with which the same engages, substantially as and for the purpose set forth.

In testimony whereof I affix my signature in presence of two witnesses.

WILLIAM D. THOMAS.

Witnesses:
J. H. FORSE,
J. N. PATTON.